United States Patent
Aoki et al.

(10) Patent No.: US 8,983,880 B2
(45) Date of Patent: Mar. 17, 2015

(54) INFORMATION SPREAD SCALE PREDICTION DEVICE, INFORMATION SPREAD SCALE PREDICTION METHOD, AND INFORMATION SPREAD SCALE PREDICTION PROGRAM

(71) Applicants: Kenji Aoki, Tokyo (JP); Satoshi Morinaga, Tokyo (JP)

(72) Inventors: Kenji Aoki, Tokyo (JP); Satoshi Morinaga, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/824,122

(22) PCT Filed: Nov. 1, 2012

(86) PCT No.: PCT/JP2012/078292
§ 371 (c)(1),
(2) Date: Mar. 15, 2013

(87) PCT Pub. No.: WO2013/073377
PCT Pub. Date: May 23, 2013

(65) Prior Publication Data
US 2014/0244551 A1      Aug. 28, 2014

(30) Foreign Application Priority Data

Nov. 18, 2011  (JP) ................................ 2011-252311

(51) Int. Cl.
*G06F 15/18*  (2006.01)
*G06N 99/00*  (2010.01)
*G06Q 30/02*  (2012.01)

(52) U.S. Cl.
CPC .............. *G06N 99/005* (2013.01); *G06Q 30/02* (2013.01)
USPC .......................................................... 706/12

(58) Field of Classification Search
None
See application file for complete search history.

(56) References Cited

FOREIGN PATENT DOCUMENTS

WO      WO 2009/116342  A1      9/2009

OTHER PUBLICATIONS

Asur, Sitaram, and Bernardo A. Huberman. "Predicting the future with social media." Web Intelligence and Intelligent Agent Technology (WI-IAT), 2010 IEEE/WIC/ACM International Conference on. vol. 1. IEEE, 2010. [Online] <retrieved Jul. 17, 2014> <http://arxiv.org/pdf/1003.5699>.*

Cha, Meeyoung, et al. "Measuring User Influence in Twitter: The Million Follower Fallacy." ICWSM 10 (2010): 10-17. [Online] <retrieved Jul. 17, 2014> <http://snap.stanford.edu/class/cs224w-readings/cha10influence.pdf>.*

(Continued)

*Primary Examiner* — Kakali Chaki
*Assistant Examiner* — Kevin W Figueroa
(74) *Attorney, Agent, or Firm* — Foley & Lardner LLP

(57) ABSTRACT

To provide an information spread scale prediction device capable of accurately predicting the number of future contributions for a specific topic in SNS and the like. The information spread scale prediction device includes: a learning text data input unit which acquires learning text data from a specific website; a node influence learning unit which calculates the influence for the number of statements by each group to which a node specifying a single specific user belongs for the topic from the number of statements by each classified topic, and stores it as learning data; a prediction text data input unit which acquires prediction text data from the specific website after storing the learning data; and a future contribution number prediction unit which predicts and outputs the number of contributions at a specific future time of the topic based on the number of statements of each topic and the learning data.

5 Claims, 3 Drawing Sheets

(56) References Cited

OTHER PUBLICATIONS

Hong, Liangjie, Ovidiu Dan, and Brian D. Davison. "Predicting popular messages in twitter." Proceedings of the 20th international conference companion on World wide web. ACM, 2011. [Online] <retrieved Jul. 17, 2014> <http://wwwconference.org/proceedings/www2011/companion/p57.pdf>.*

Yuya Yoshikawa et aol, Estimating Method of Expected Influence Curve from Single Diffusion Sequence on Social Networks, The IEICE Transactions on Information and Systems, Nov. 2011, pp. 1899-1908, vol. J94-D, No. 11.

The First Step to Leveraging Twitter Marketing, Nikkei NETMarketing, May 25, 2010, pp. 44-47.

Kazuki Yoshimoto et al., A Calculation Method of Blogger's Importance Using Influences to Others in Micro-Blogs, The Second Forum on Data Engineering and Infomration Management, DEIM 2010, Jun. 9, 2010, pp. 1-8.

Kyosuke Nishida et al., Tweet-Topic Classification Using Data Compression, DBSJ Journal, Jun. 2011, pp. 1-6, vol. 10, No. 1.

Branding Analysis (Grasp and Measure for Damages caused by Rumors). IBM Japan Searched on Nov. 4, 2011, Internet <URL: http://www-06.ibm.com/services/bcs/jp/solutions/sc/pdf/brandinp.pdf>.

* cited by examiner

INFORMATION SPREAD SCALE PREDICTION DEVICE, INFORMATION SPREAD SCALE PREDICTION METHOD, AND INFORMATION SPREAD SCALE PREDICTION PROGRAM

This application is a National Phase of PCT/JP2012/078292, filed Nov. 1, 2012, which claims priority to Japanese application No. 2011-25211, filed Nov. 18, 2011, the disclosures of which are hereby incorporated by reference in their entirety.

TECHNICAL FIELD

The present invention relates to an information spread scale prediction device, an information spread scale prediction method, and an information spread scale prediction program. More specifically, the present invention relates to an information spread scale prediction device and the like for predicting the number of future contributions for a specific topic in a specific website.

BACKGROUND ART

The Internet has already been popularized as the important media along with the publishing, broadcasting, and the like. Particularly in recent years, websites called SNS (Social Network Service), specifically Twitter, Facebook, Mixi (all registered trademarks), and the like are dramatically popularized and have come to impose great influence upon the society.

When negative rumors for a specific business corporation or product is written in SNS, web blog, or the like on a website, the rumors rapidly spread and cause critical bad influence for the sales thereof, i.e., generates damages by rumors. Thus, the business corporations cannot disregard the state of the rumors on SNS and the like in terms of the crisis management.

Therefore, there already exist a great number of techniques and services for analyzing the contribution state on SNS as disclosed in Non-Patent Document 1, for example. Further, as in Patent Document 1, there is already known a technique which estimates the influence imposed upon other media based on theories such as the mechanical learning and the mathematical statistics by each kind of websites, and predicts the future contribution state based on that information.

Patent Document 1: WO 2009/116342
Non-Patent Document 1: "Branding Analysis (Grasp and Measure for Damages caused by Rumors)". IBM Japan Searched on Nov. 4, 2011, Internet <URL: http://www-06.ibm.com/services/bcs/jp/solutions/sc/pdf/branding.pdf>

However, those techniques predict the future contribution state by calculating the influence by "each kind of websites" but do not estimate it by "each contributor (or attribute of contributor)". Thus, there is no such specific technique which can accurately predict the future contribution state, so that the only way is to take a measure by predicting the future contribution state based on the contribution state of the past to the present based on the human intuition.

In addition to that, there are many cases where all the contributions from the past to the present cannot be acquired with the websites such as SNS due to the restrictions of the system and managerial controls. With Twitter, for example, only 10% of all the contributions can be acquired even if permission for the use thereof can be acquired from the operating company. It is only 1% that can be acquired without the permission for the use. Moreover, a specific topic that has not been the subject of talks in the society may become a target of monitoring because of occurrence of some kind of events. In the cases corresponding to each of the above-described circumstances, amount of the contribution data that can be used for estimation of the influence is small.

Further, even when all the contribution data can be acquired, the number of contributions and the contributors is extremely large. Thus, it often happens that all the acquired data cannot be utilized due to the restrictions such as the processing capacity of the computer to be used for the processing. Because of the above-described reasons, it is difficult to estimate the influence of each contributor. It is even more difficult to predict the future contribution state based thereupon.

It is therefore an object of the present invention to provide an information spread scale prediction device, an information spread scale prediction method, and an information spread scale prediction program, which make it possible to accurately predict the influence of each contributor and the number of future contributions for a specific topic in websites such as SNS.

In order to achieve the foregoing object, the information spread scale prediction device according to the present invention is an information spread scale prediction device which acquires text data from a specific website via the Internet, predicts number of future contributions made to the website based on the text data, and outputs a prediction result thereof, and the information spread scale prediction device is characterized to include: a learning text data input unit which acquires the text data from the specific website as learning text data; a node influence learning unit which classifies the learning text data by each topic, calculates influence for the number of contributions by each group to which a node indicating a specific user belongs for the topic from the number of contributions of each of the classified topics, and stores a result thereof as learning data to a storage module provided in advance; a prediction text data input unit which acquires the text data from the specific website as prediction text data after storing the learning data; and a future contribution number prediction unit which classifies the prediction text data by each topic, predicts the number of contributions of the topics at a specific future time based on the number of contributions by each of the classified topics and the learning data, and outputs a result thereof to an output module provided in advance.

In order to achieve the foregoing object, the information spread scale prediction method according to the present invention is used with an information spread scale prediction device which acquires text data from a specific website via the Internet, predicts number of future contributions made to the website based on the text data, and outputs a prediction result thereof, and the method is characterized that: a learning text data input unit acquires the text data from the specific website as learning text data; a node influence learning unit classifies the learning text data by each topic; the node influence learning unit calculates influence for the number of contributions by each group to which a node indicating a specific user belongs for the topic from the number of contributions of each of the classified topics, and stores a result thereof as learning data to a storage module provided in advance; a prediction text data input unit acquires the text data from the specific website as prediction text data after storing the learning data; a future contribution number prediction unit classifies the prediction text data by each topic, the future contribution number prediction unit predicts the number of contributions of the topics at a specific future time based on the number of contributions by each of the classified topics and the learning data; and the future contribution number prediction unit outputs a result thereof to an output module provided in advance.

In order to achieve the foregoing object, the information spread scale prediction program according to the present invention is used in an information spread scale prediction device which acquires text data from a specific website via the Internet, predicts number of future contributions made to the website based on the text data, and outputs a prediction result thereof, and the program is characterized to cause a computer provided to the information spread scale prediction device to execute: a procedure for acquiring the text data from the specific website as learning text data; a procedure for classifying the learning text data by each topic; a procedure for calculating influence for the number of contributions by each group to which a node indicating a specific user belongs for the topic from the number of contributions of each of the classified topics, and storing a result thereof as learning data to a storage module provided in advance; a procedure for acquiring the text data from the specific website as prediction text data after storing the learning data; a procedure for classifying the prediction text data by each topic; a procedure for predicting the number of contributions of the topics at a specific future time based on the number of contributions by each of the classified topics and the learning data; and a procedure for outputting a result thereof to an output module provided in advance.

As described above, the present invention is structured to calculate the influence of a specific user for a specific topic from learning text data acquired from a specific website, save it as learning data, and predict the number of future contributions for the specific topic from the learning data and the prediction text data acquired additionally. Therefore, it is possible to execute the processing for prediction with an amount data that can be practically calculated.

This makes it possible to provide the information spread scale prediction device, the information spread scale prediction method, and the information spread scale prediction program, which exhibit such an excellent feature of making it possible to accurately predict the influence of each contributor and the number of future contributions for a specific topic in websites such as SNS.

Figure 1:
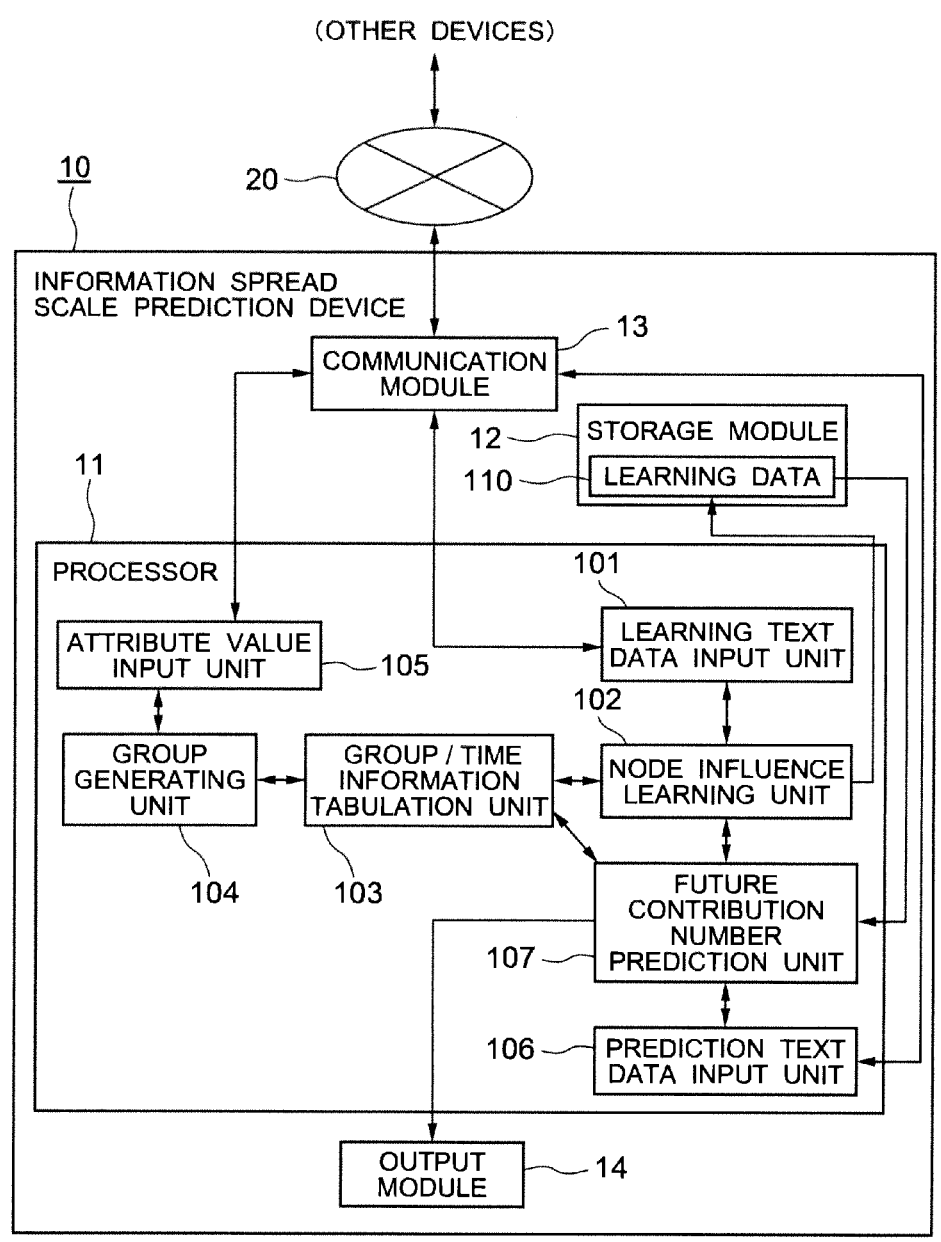
FIG. 1 is an explanatory chart showing the structure of an information spread scale prediction device according to an exemplary embodiment of the present invention.

BEST MODES FOR CARRYING OUT THE INVENTION (Exemplary Embodiment)

Hereinafter, the structure of the exemplary embodiment of the present invention will be described by referring to accompanying drawing FIG. 1.

The basic contents of the exemplary embodiment will be described first, and more specific contents thereof will be described thereafter. An information spread scale prediction device 10 according to the exemplary embodiment is an information spread scale prediction device which acquires text data from a specific website via the Internet 20, predicts the number of future contributions for the website based on the text data, and outputs the prediction result thereof. The information spread scale prediction device 10 includes: a learning text data input unit 101 which acquires text data as learning text data from the specific website; a node influence learning unit 102 which classifies the learning text data by each topic, calculates the influence for the number of contributions by each group to which a node specifying a specific user for the topic belongs from the number of contributions by each of the classified topics, and stores the result thereof as learning data 110 to a storage module 12 provided in advance; a prediction text data input unit 106 which acquires text data as prediction text data from the specific website after storing the learning data; and a future contribution number prediction unit 107 which classifies the prediction text data by each topic, predicts the number of contributions of the topic at a specific future time based on the number of contributions of each of the classified topics and the learning data, and outputs the result thereof to an output module 14 provided in advance.

Further, the information spread scale prediction device 10 further includes: a group generating unit 104 which classifies the nodes into groups based on information regarding attributes of each of the nodes; and a group/time information tabulation unit 103 which cross-tabulates the number of statements by each time and each group based on the learning text data and the prediction text data, and outputs the result thereof to the node influence learning unit and the future contribution number prediction unit.

Further, the node influence learning unit 102 acquires influence βs at time s as a value when the numerical value of f(ys, Xs, βs) shown as a following expression is minimized, provided that the number of statements cross-tabulated by each time and each of the groups is a matrix X, the number of statements of a group j at time i of the matrix X is an element xij, a submatrix extracted from the first row of the matrix X to the s-th row is Xs, the total sum for all the nodes of the number of statements at each time is ys, and a value of a density function at x in Poisson distribution of average α is P0(x, α).

$$f(y_s, X_s, \beta_s) = -\sum_{t=s+1}^{T} \log\left\{P_0\left[y_t, \exp\left(\sum_{g=1}^{G} \beta_{sg} x_{(t-s)g}\right)\right]\right\}$$

Further, the node influence learning unit 102 acquires the group influence βs at the time s as the value when minimizing the numerical value that is acquired through adding the value, which is acquired by multiplying βs that is L1-regularized or L2-regularized by a regularization parameter given in advance, to f(ys, Xs, βs).

With the above-described structure, the information spread scale prediction device 10 according to the exemplary embodiment can accurately predict the influence of each contributor and the number of future contributions for the specific topic.

Hereinafter, this will be described in more details.

FIG. 1 is an explanatory chart showing the structure of the information spread scale prediction device 10 according to the exemplary embodiment of the present invention. The information spread scale prediction device 10 is provided with the basic structure as a computer device. That is, the information spread scale prediction device 10 includes: a processor 11 as the main body for executing computer programs; the storage module 12 for storing data; a communication module 13 for executing data transmissions with other devices via the Internet; and a display module 14 for presenting the processing results to the user.

The main calculation control module 11 functions as the learning text data input unit 101 to be described later, the node influence learning unit 102, the group/time information tabulation unit 103, the group generating unit 104, an attribute value input unit 105, the prediction text data input unit 106, and the future contribution number prediction unit 107 through execution of the computer programs. Each of those units can also be constituted to be executed by separate computer devices.

The text data learning unit 101 acquires text data and incidental attribute data thereof from an acquisition-target website according to a learning period and a learning interval given in advance via the communication module 13 and the Internet 20. For example, in a case where Twitter is the acquisition target, information regarding the time of tweet, the node of tweet, and the topic to which the tweet belongs is acquired at the same time along with the tweeted text data by each tweet. Those acquired data are given to the node influence learning unit 102.

The "node" herein is defined as "the unit for estimating the influence" in the present invention. More specifically, the node may be defined as a unit of "contributor", a unit of "media" to which the contributor belongs, or a unit of "operating organization".

For example, in a case where the monitoring-target website is Twitter, "the number of tweets (number of statements)", "the number of follows", "the number of followers", "the number of replies by each tweet", "the number of retweets by each tweet", and the like can be defined as the attributes of the node. Further, the content itself of the contributed article, e.g., "kind of word", "appearance frequency", and the like contained in the article may also be defined as the attributes of the node.

Among those values, there are values that may change during a learning data acquiring period (referred to as a learning period). However, here, "the number of contributions", "the number of tweets", "the average value of the number of comments", "the average value of the number of trackbacks", "the average value of the number of replies", "the average value of the number of retweets", "the maximum value of the number of follows", "the maximum value of the number of followers", and the like in the learning period may be calculated by each contributor and take those as the attributes of the node.

Upon receiving input of those data, the node influence learning unit 102 classifies each statement by each topic, and outputs the node information/time information/text data of the statement belonging to the topic to the group/time information tabulation unit 103 by each topic. The group/time information tabulation unit 103 cross-tabulates the group/time information by each of those topics, and returns the result to the node influence learning unit 102.

Upon receiving the group/time information that is cross-tabulated by each topic returned from the group/time information tabulation unit 103, the node influence learning unit 102 calculates the influence of each group, calculates the influence of each node subsequently, and then outputs the calculated influences of the nodes to the future contribution number prediction unit 107.

The group/time information tabulation unit 103 generates cross tabulation data of time×group regarding the number of statements based on the attributes of each statement inputted from the node influence learning unit 102, e.g., the node information/time information/text data of the tweet belonging to a single topic in a case of Twitter, and the information of the group to which the node belongs inputted from the group generating unit 104, and outputs the cross tabulation data to the node influence learning unit 102.

The group generating unit 104 classifies each of the nodes into groups based on the attribute values of the nodes inputted from the attribute value input unit 105, and outputs the group information to the group/time information tabulation unit 103. The attribute value input unit 105 outputs the attribute values of the nodes inputted from the outside of the device to the group generating unit 104.

The prediction text data input unit 106 acquires text data and incidental attribute data thereof from an acquisition-target website according to a prediction interval given in advance via the communication module 13 and the Internet 20, as in the case of the learning text data input unit 101. Those acquired data are given to the future contribution number prediction unit 107.

Upon receiving input of those data from the prediction text data input unit 106 and input regarding the influence of each node from the node influence learning unit 102, the future contribution number prediction unit 107 outputs the node information/time information/text data of the statement belonging to the topic to the group/time information tabulation unit 103 by each of the topics to which each statement is classified. The group/time information tabulation unit 103 cross-tabulates the group/time information by each of the topics and returns the result to the future contribution number prediction unit 107.

Upon receiving the group/time information that is cross-tabulated by each topic returned from the group/time information tabulation unit 103, the future contribution number prediction unit 107 calculates the prediction value of the future contribution number and displays the result on the display module 14. The display module 14 may be a computer that is different from the information spread scale prediction device 10.

The "future contribution state" herein refers to how many contributions (information spread scale) for the article exist in the target website in the future of how many hours later (information spread speed) regarding a specific topic designated in advance (e.g., a topic designated as the one focused by the supervisor). Further, regarding each of the contributed articles, information showing the node of the contributor, contributed time, and showing that the articles are related to which topic (may be a plurality of topics) is given.

The operations of the information spread scale prediction device 10 described above are roughly classified into two stages of a "learning phase" and a "prediction phase". Hereinafter, each of those will be described. In the following case, it is assumed that all the monitoring-target websites are Twitter.

Figure 2:
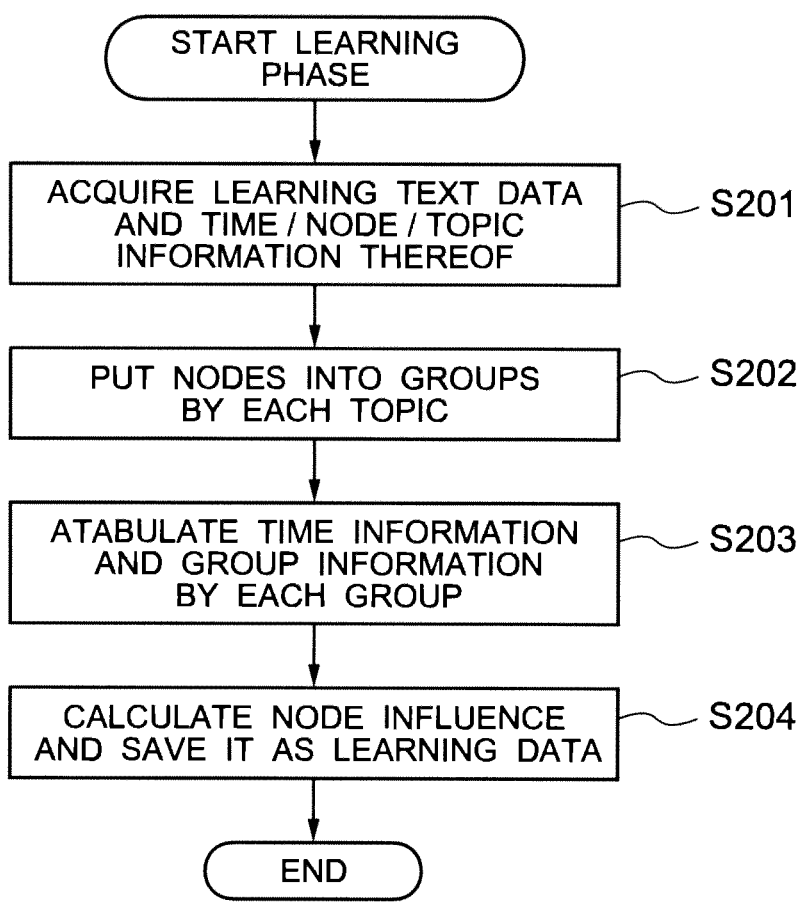
FIG. 2 is a flowchart showing operations of the information spread scale prediction device shown in FIG. 1 executed in a learning phase.

FIG. 2 is a flowchart showing the operation of the learning phase executed by the information spread scale prediction device 10 shown in FIG. 1. First, the learning text data input unit 101 operates to acquire a text data tweeted on Twitter for learning according to a learning period and a learning interval given in advance via the communication module 13 and the Internet 20. At the same time, information regarding tweeted time, the node of tweet, and the topic to which the tweet belongs is acquired by each tweet. Those acquired data are given to the node influence learning unit 102 (step S201).

Upon receiving input of those data, the node influence learning unit 102 classifies each tweet by each topic, and outputs the node information/time information/text data of the tweet belonging to the topic to the group/time information tabulation unit 103 by each topic (step S202). The group/time information tabulation unit 103 cross-tabulates the group/ time information by each of those topics by utilizing the information of the group to which the node belongs inputted from the group generating unit 104 and returns the result to the node influence learning unit 102 (step S203).

Upon receiving the cross-tabulated group/time information, the node influence learning unit 102 calculates the influence of the group, calculates the influence of the node based on that value, and saves it to the storage module 12 as the learning data 110 (step S204).

Figure 3:
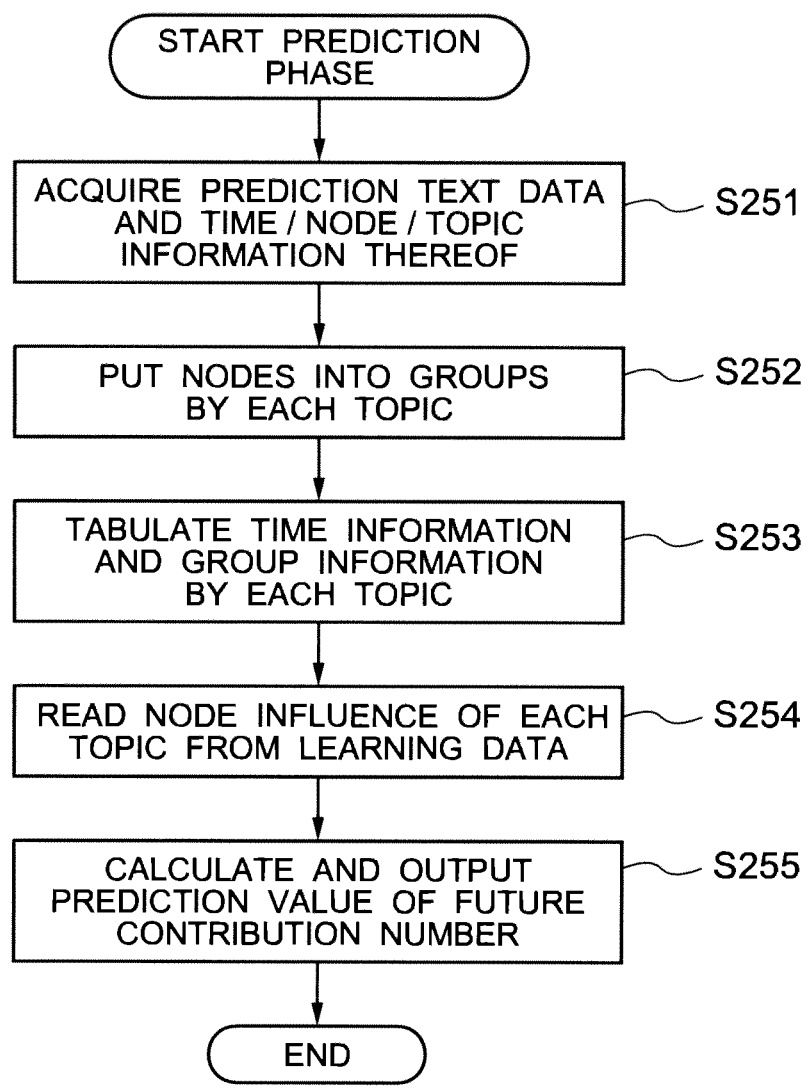
FIG. 3 is a flowchart showing operations of the information spread scale prediction device shown in FIG. 1 executed in a prediction phase.

FIG. 3 is a flowchart showing the operation of the prediction phase executed by the information spread scale prediction device 10 shown in FIG. 1. First, the prediction text data input unit 106 operates to acquire a text data tweeted on Twitter for prediction according to a prediction period given in advance. At the same time, information regarding tweeted time, the node of tweet, and the topic to which the tweet belongs is acquired by each tweet. Those acquired data are given to the future contribution number prediction unit 107 (step S251).

Upon receiving input of those data, the future contribution number prediction unit 107 classifies each tweet by each topic, and outputs the node information/time information/text data of the tweet belonging to the topic to the group/time information tabulation unit 103 by each topic (step S252). The group/time information tabulation unit 103 cross-tabulates the group/time information by each of those topics by utilizing the information of the group to which the node belongs inputted from the group generating unit 104 and returns the result to the future contribution number prediction unit 107 (step S253).

The processing of the above-described steps S251 to 253 is the same processing as that of steps S201 to 203 of FIG. 2, so that the group/time information tabulation unit 103, the group generating unit 104, and the attribute value input unit 105 can be used in common in the learning phase and the prediction phase. Upon receiving the cross-tabulated group/time information, the future contribution number prediction unit 107 reads out the learning data regarding the influence of the node from the storage module 12 (step S254), calculates the predicted value of the future contribution number and displays it on the display module 14 (step S255).

(Example of Processing Content)

Hereinafter, the contents of each processing of the learning phase and the prediction phase executed by the information spread scale prediction device 10 shown in FIGS. 2 to 3 will be described in more details. The presuppositions of the example of the processing contents shown hereinafter are as follows.

The analysis target is text data tweeted (contributed) on Twitter.

The topic to be the prediction target of the future contribution number (tweet number) is designated in advance.

By each tweet, information of the tweet regarding "the user that has tweeted", "the tweeted data", and "the topic to which the tweet belongs" is being acquired.

The period for executing the processing for acquiring the text data and the time interval are designated in advance for the learning phase and the prediction phase, respectively. Note, however, that the prediction phase is executed after the learning phase completed.

One user (contributor) is considered one node.

"Client software", "the tweet number within a learning period", "average values of the comment number, the trackback number, the reply number, the retweet number in a learning period, respectively", and "the maximum values of the follow number and follower number in a learning period" by each node (user) are acquired in advance.

Further, in the example shown hereinafter, it is assumed that only one topic is designated as the target of estimation and prediction. In a case where a plurality of topics are designated, estimation and prediction may be executed by the method described hereinafter by each of the topics.

First, the node influence learning unit 102 executes grouping of each node in the processing of step S202 shown in FIG. 2 from each data acquired by the learning text data input unit 101 in the processing of step S201 shown in FIG. 2. There are following points as the viewpoints for the grouping. Further, it is also possible to take a product set of the grouping results for a plurality of attributes as the final grouping result.

Type of used "client software".

Type of "OS (operating system)" which operates the client software.

Division to which "tweet number within a learning period" belongs (e.g., the node belongs to which of the divisions among "1 to 100 times", "101 to 1000 times", and "1001 times or more")

Division to which "the maximum value of the followers within a learning period" belongs (e.g., the node belongs to which of the divisions among "1 to 1000 followers" and "1001 followers or more".

Further, for the node with the tweet number of a specific value or more, the node itself can be defined as a single group. As a result of the grouping, each node comes to belong to a single group or a plurality of groups. Through the grouping, the number of nodes can be reduced substantially. This contributes to stabilizing the estimation result of the influence of the node.

Subsequently, the group/time information tabulation unit 103 tabulates the number of tweets done by each of the groups and time in the processing shown in step S203 of FIG. 2, and generates a cross tabulation table of time ×group regarding the number of tweets. The tabulation result (cross tabulation table) can be shown with a matrix X of Expression 1 shown below. The row of the matrix X shows time, the column shows the group, and element xij of the matrix shows "the number of tweets of the group j at time i".

$$X = \begin{bmatrix} x_{11} & x_{12} & \ldots & x_{1G} \\ x_{21} & x_{22} & \ldots & x_{2G} \\ \ldots & \ldots & \ldots & \ldots \\ x_{T1} & x_{T2} & \ldots & x_{TG} \end{bmatrix} \quad \text{(Expression 1)}$$

Subsequently, the group/time information tabulation unit 103 estimates the influence of each node by the processing shown in step S204 of FIG. 2. The influence of the node is calculated based on the influence of the group. Note here that the influence of the group is given by a matrix β shown in Expression 2 below. The row of the matrix shows that it is the future of how many hours later under a tabulation unit time, the column shows the group (as in Expression 1), and element βij of the matrix is defined as "the sum of the influences of the group j in the future of i-time later".

$$\beta = \begin{bmatrix} \beta_{11} & \beta_{12} & \ldots & \beta_{1G} \\ \beta_{21} & \beta_{22} & \ldots & \beta_{2G} \\ \ldots & \ldots & \ldots & \ldots \\ \beta_{S1} & \beta_{S2} & \ldots & \beta_{SG} \end{bmatrix} \quad \text{(Expression 2)}$$

Specifically, as a method for calculating the "group influence", there is a method which takes the value of β that minimizes following Expression 3 as the group influence, for example. In the first term "f(ys, Xs, βs)" of Expression 3, ys shown in Expression 4 is the total sum of the number of tweets at each time for all the nodes, and Xs is a submatrix that is an extraction of the first row to the T-s-th row of the matrix X shown in Expression 1. Further, λ of the second term λP(βs) is a parameter called a regularization parameter for adjusting the stability of the estimation result. The more specific definition of P(βs) will be described later.

$$f(y_s, X_s, \beta_s) + \lambda P(\beta_s), s=1, \ldots, S \quad \text{(Expression 3)}$$

$$y_s = (y_{s+1}, \ldots, y_T)^t \quad \text{(Expression 4)}$$

More specifically, "f(ys, Xs, βs)" of Expression 3 is calculated as in following Expression 5.

Note here that P0(x, α) is the value of the density function at x in the Poisson distribution of average α.

$$f(y_s, X_s, \beta_s) = -\sum_{t=s+1}^{T} \log\left\{ P_0\left[ y_t, \exp\left( \sum_{g=1}^{G} \beta_{sg} x_{(t-s)g} \right) \right] \right\} \quad \text{(Expression 5)}$$

More specifically, the second term P(βs) of Expression 3 is calculated as in following Expression 6 or Expression 7. The calculation shown in Expression 6 is a method called L1 regularization, and the calculation shown in Expression 7 is called L2 regularization. The regularization herein is a method which is used in the field of mechanical learning and mathematical statistics for acquiring a stable estimation result in a state where a sufficient amount of learning data cannot be acquired. Further, it is also possible to employ calculation in which the second term of Expression 3 is omitted so that elements of the regularization are not included therein.

$$P(\beta_s) = \sum_{g=1}^{G} |\beta_{sg}| \quad \text{(Expression 6)}$$

$$P(\beta_s) = \sum_{g=1}^{G} \beta_{sg}^2 \quad \text{(Expression 7)}$$

The information spread scale prediction device 10 executes the operation of the prediction phase shown in FIG. 3 based on the learning data generated in the above-described processing (the learning phase). The processing of steps S251 to S254 in the prediction phase shown in FIG. 3 is executed in the same manner as the processing of steps S201 to 204 of the learning phase shown in FIG. 2, in which the prediction text data input unit 106 acquires the tweeted text data and the future contribution number prediction unit 107 cross-tabulates the group/time information by each topic based on the text data. The tweet number z of each group acquired by the cross tabulation is expressed as in following Expression 8.

$$z=(z_1, \ldots, z_G) \quad \text{(Expression 8)}$$

Then, the future contribution number prediction unit 107 calculates the influence of each node, i.e., the predicted contribution number in the future for the time s from the current time, by using processing of Expression 9 through the processing shown in step S255 of FIG. 3 by utilizing the cross-tabulated data and the learning data.

$$\sum_{g=1}^{G} \beta_{sg} z_g \quad \text{(Expression 9)}$$

The example of predicting only the number of contributions at a given point of time when predicting the future contribution number from the certain point of time is described above. However, it is possible to predict the number of contributions at the latest several points of time including that point of time by expanding the example. In that case, a matrix Z showing the contribution number in the latest time zone of 1 to A including the time s, for example, is defined as in following Expression 10. The row of the matrix Z shows that it is the future of how many hours later, the column shows the group (as in Expression 1), an element zij of the matrix is defined as "the predicted contribution number of the group j in the future of i-time later", and each of those is actually calculated by the expression shown in Expression 9.

$$Z = \begin{bmatrix} z_{11} & z_{12} & \ldots & z_{1G} \\ z_{21} & z_{22} & \ldots & z_{2G} \\ \ldots & \ldots & \ldots & \ldots \\ z_{A1} & z_{A2} & \ldots & z_{AG} \end{bmatrix} \quad \text{(Expression 10)}$$

(Overall Operations of Exemplary Embodiment)

Next, the overall operations of the exemplary embodiment will be described.

The information spread scale prediction method according to the exemplary embodiment is used with the information spread scale prediction device 10 which acquires text data from a specific website vie the Internet, predicts the number of contributions made in the future to the website based on the text data, and outputs the prediction result. With the method, the learning text data input unit acquires the text data from a specific website as learning text data (FIG. 2, step S201); the node influence learning unit classifies the learning text data by each topic (FIG. 2, step S202); the node influence learning unit calculates the influence of the contribution number by each group to which the node indicating a specific user for the topic belongs based on the number of contributions by each of the classified topics, and stores the result as learning data to the storage module provided in advance (FIG. 2, steps S203 to 204); the prediction text data input unit acquires the text data from the specific website as prediction text data after storing the learning data (FIG. 3, step S251); the future contribution number prediction unit classifies the prediction text data by each topic (FIG. 3, step S254); and the future contribution number prediction unit predicts the number of contributions at a future specific point of time from the number of statements by each of the classified topics and the learning data, and outputs the result to the output module provided in advance (FIG. 3, steps S253 to 255).

Note here that each of the above-described steps may be put into programs to be executed by a computer, and may have those executed by the processor 11 of the information spread scale prediction device 10 which directly executes each of the steps. The program may be recorded on a non-transitory recording medium such as a DVD, a CD, a flash memory, or the like. In that case, the program is read out from the recording medium and executed by a computer. Through this operation, the exemplary embodiment can provide following effects.

As described, the exemplary embodiment is structured to: calculate the influence of a specific user for a specific topic in the learning phase; save it as the learning data; and predict the future contribution number of the specific topic in the prediction phase based on the learning data and the prediction text data acquired additionally.

Thereby, it becomes possible to calculate the influence with a minute granularity into a small unit of individual user within a range of practically processable calculation amount. Therefore, the number of contributions predicted based thereupon can also be done with a granularity of same degree as that of the learning phase. This processing can be done in a regular manner that is close to realtime processing, provided that the period and the time interval of the processing are set in advance for the learning phase and the prediction phase, respectively.

(Expansion of Exemplary Embodiment)

In the example of the processing content described above, the tabulation target is limited to Twitter. However, the same processing can be executed with the same method for others such as Facebook, Mixi, or weblogs of each company by setting the each topic and attributes of each node according to the characteristics of each site.

Further, it is also possible to execute the processing under the condition of 1 user=1 node=1 group without specifically grouping each of the nodes into groups. Further, it is also possible to employ calculation that does not include any regularization element by omitting the second term of Expression 3 described above.

While the present invention has been described above by referring to the specific embodiment shown in the drawings, the present invention is not limited only to the embodiment described above. Any other known structures can be employed, as long as the embodiments of the present invention can be achieved therewith.

Regarding each of the embodiments described above, the new technical contents of the above-described embodiments can be summarized as follows. While a part of or a whole part of the embodiments can be summarized as follows as the new techniques, the present invention is not necessarily limited only to the followings.

(Supplementary Note 1)

An information spread scale prediction device which acquires text data from a specific website via the Internet, predicts number of future contributions made to the website based on the text data, and outputs a prediction result thereof, and the information spread scale prediction device includes:
  a learning text data input unit which acquires the text data from the specific website as learning text data;
  a node influence learning unit which classifies the learning text data by each topic, calculates influence for the number of contributions by each group to which a node indicating a specific user belongs for the topic from the number of contributions of each of the classified topics, and stores a result thereof as learning data to a storage module provided in advance;
  a prediction text data input unit which acquires the text data from the specific website as prediction text data after storing the learning data; and
  a future contribution number prediction unit which classifies the prediction text data by each topic, predicts the number of contributions of the topics at a specific future time based on the number of contributions by each of the classified topics and the learning data, and outputs a result thereof to an output module provided in advance.

(Supplementary Note 2)

The information spread scale prediction device as depicted in Supplementary Note 1, which includes:
  a group generating unit which classifies the nodes into groups based on information regarding attributes of each of the nodes; and
  a group/time information tabulation unit which performs cross tabulation regarding the number of contributions from the learning text data and the prediction text data by each time and each of the groups, and outputs a result thereof to the node influence learning unit and the future contribution number prediction unit.

(Supplementary Note 3)

The information spread scale prediction device as depicted in Supplementary Note 2, wherein:
  provided that the number of contributions cross-tabulated by each time and each of the groups is a matrix X, the number of contributions of a group j at time i of the matrix X is an element xij, a submatrix extracted from a first row of the matrix X to an s-th row is Xs, a total sum for all the nodes of the number of contributions at each time is ys, and a value of a density function at x in Poisson distribution of average $\alpha$ is P0(x, $\alpha$), the node influence learning unit acquires influence $\beta$s of the group at time s as a value when minimizing a numerical value of f(ys, Xs, $\beta$s) shown as $$f(y_s, X_s, \beta_s) + \lambda P(\beta_s), s=1, \ldots, S$$

(Supplementary Note 4)

The information spread scale prediction device as depicted in Supplementary Note 3, wherein
  the node influence learning unit acquires the influence $\beta$s of the group at the time s as a value when minimizing a numerical value that is acquired through adding a value, which is acquired by multiplying $\beta$s that is L1-regularized or L2-regularized by a regularization parameter given in advance, to f(ys, Xs, $\beta$s).

(Supplementary Note 5)

An information spread scale prediction method used with an information spread scale prediction device which acquires text data from a specific website via the Internet, predicts number of future contributions made to the website based on the text data, and outputs a prediction result thereof, wherein:
  a learning text data input unit acquires the text data from the specific website as learning text data;
  a node influence learning unit classifies the learning text data by each topic;
  the node influence learning unit calculates influence for the number of contributions by each group to which a node indicating a specific user belongs for the topic from the number of contributions of each of the classified topics, and stores a result thereof as learning data to a storage module provided in advance;
  a prediction text data input unit acquires the text data from the specific website as prediction data after storing the learning data;
  a future contribution number prediction unit classifies the prediction text data by each topic,
  the future contribution number prediction unit predicts the number of contributions of the topics at a specific future time based on the number of contributions by each of the classified topics and the learning data; and
  the future contribution number prediction unit outputs a result thereof to an output module provided in advance.

(Supplementary Note 6)

An information spread scale prediction program used in an information spread scale prediction device which acquires text data from a specific website via the Internet, predicts number of future contributions made to the website based on the text data, and outputs a prediction result thereof, and the program causes a computer provided to the information spread scale prediction device to execute:

a procedure for acquiring the text data from the specific website as learning text data;
a procedure for classifying the learning text data by each topic;
a procedure for calculating influence for the number of contributions by each group to which a node indicating a specific user belongs for the topic from the number of contributions of each of the classified topics, and storing a result thereof as learning data to a storage module provided in advance;
a procedure for acquiring the text data from the specific website as prediction data after storing the learning data;
a procedure for classifying the prediction text data by each topic;
a procedure for predicting the number of contributions of the topics at a specific future time based on the number of contributions by each of the classified topics and the learning data; and
a procedure for outputting a result thereof to an output module provided in advance.

Industrial Applicability

The present invention can be employed for a technique for information spread scale prediction that is utilized in business crisis control, marketing research, and the like.

REFERENCE NUMERALS

10 Information spread scale prediction device
11 Processor
12 Storage module
13 Communication module
14 Display module
20 Internet
101 Learning text data input unit
102 Node influence learning unit
103 Group/time information tabulation unit
104 Group generating unit
105 Attribute value input unit
106 Prediction text data input unit
107 Future contribution number prediction unit
110 Learning data

The invention claimed is:

1. An information spread scale prediction device, including at least one computer device, which acquires text data from a specific website via the Internet, predicts number of future contributions made to the website based on the text data, and outputs a prediction result thereof, the information spread scale prediction device comprising:

a learning text data input unit including a processor which acquires the text data from the specific website as learning text data;
a group generating unit including a processor which classifies nodes into groups based on information regarding attributes of each of the nodes indicating a specific user;
a node influence learning unit including a processor which classifies the learning text data by each topic, calculates influence for the number of contributions by each of the groups to which the node belongs for the topic from the number of contributions of each of the classified topics, and stores a result thereof as learning data to a storage module;
a prediction text data input unit including a processor which acquires the text data from the specific website as prediction data after storing the learning data;
a group/time information tabulation unit including a processor which performs cross tabulation regarding the number of contributions from the learning text data and the prediction text data by each time and each of the groups, and outputs a result thereof to the node influence learning unit; and
a future contribution number prediction unit including a processor which classifies the prediction text data by each topic, predicts the number of contributions of the topics at a specific future time based on the number of contributions by each of the classified topics, the learning data, and the number of contributions cross-tabulated, and outputs a result thereof to an output module provided in advance, wherein:
provided that the number of contributions cross-tabulated by each time and each of the groups is a matrix X, the number of contributions of a group j at time i of the matrix X is an element xij, a submatrix extracted from a first row of the matrix X to an s-th row is Xs, a total sum for all the nodes of the number of contributions at each time is ys, and a value of a density function at x in Poisson distribution of average α is P0(x, α), the node influence learning unit acquires influence βs of the group at time s as a value when minimizing a numerical value of f(ys, Xs, βs) shown as $$f(y_s, X_s, \beta_s) + \lambda P(\beta_s), s=1, \ldots, S.$$

2. The information spread scale prediction device as claimed in claim 1, wherein
the node influence learning unit acquires the influence βs of the group at the time s as a value when minimizing a numerical value that is acquired through adding a value, which is acquired by multiplying βs that is L1-regularized or L2-regularized by a regularization parameter given in advance, to f(ys, Xs, βs).

3. An information spread scale prediction method used with an information spread scale prediction device which acquires text data from a specific website via the Internet, predicts number of future contributions made to the website based on the text data, and outputs a prediction result thereof, wherein:

a learning text data input unit acquires the text data from the specific website as learning text data;
a group generating unit classifies nodes into groups based on information regarding attributes of each of the nodes indicating a specific user;
a node influence learning unit classifies the learning text data by each topic;
the node influence learning unit calculates influence for the number of contributions by each of the groups to which the node belongs for the topic from the number of contributions of each of the classified topics, and stores a result thereof as learning data to a storage module;
a prediction text data input unit acquires the text data from the specific website as prediction data after storing the learning data;
a group/time information tabulation unit performs cross tabulation regarding the number of contributions from the learning text data and the prediction text data by each time and each of the groups, and outputs a result thereof to the node influence learning unit;
a future contribution number prediction unit classifies the prediction text data by each topic, the future contribution number prediction unit predicts the number of contributions of the topics at a specific future time based on the number of contributions by each of the classified topics, the learning data, and the number of contributions cross-tabulated; and the future contribution number prediction unit outputs a result thereof to an output module, wherein:

provided that the number of contributions cross-tabulated by each time and each of the groups is a matrix X, the number of contributions of a group j at time i of the matrix X is an element xij, a submatrix extracted from a first row of the matrix X to an s-th row is Xs, a total sum for all the nodes of the number of contributions at each time is ys, and a value of a density function at x in Poisson distribution of average $\alpha$ is $P0(x,\alpha)$, the node influence learning unit acquires influence $\beta s$ of the group at time s as a value when minimizing a numerical value of $f(ys, Xs, \beta s)$ shown as $$f(y_s, X_s, \beta_s) + \lambda P(\beta_s), s=1, \ldots, S.$$

4. A non-transitory computer readable recording medium storing an information spread scale prediction program used in an information spread scale prediction device which acquires text data from a specific website via the Internet, predicts number of future contributions made to the website based on the text data, and outputs a prediction result thereof, the program causing a computer provided to the information spread scale prediction device to execute:

a procedure for acquiring the text data from the specific website as learning text data;

a procedure for classifying nodes into groups based on information regarding attributes of each of the nodes indicating a specific user;

a procedure for classifying the learning text data by each topic;

a procedure for calculating influence for the number of contributions by each of the groups to which the node belongs for the topic from the number of contributions of each of the classified topics, and storing a result thereof as learning data to a storage module;

a procedure for acquiring the text data from the specific website as prediction data after storing the learning data;

a procedure for performing cross tabulation regarding the number of contributions from the learning text data and the prediction text data by each time and each of the groups;

a procedure for classifying the prediction text data by each topic;

a procedure for predicting the number of contributions of the topics at a specific future time based on the number of contributions by each of the classified topics, the learning data and the number of contributions cross-tabulated; and a procedure for outputting a result thereof to an output module;

wherein:

provided that the number of contributions cross-tabulated by each time and each of the groups is a matrix X, the number of contributions of a group j at time i of the matrix X is an element xij, a submatrix extracted from a first row of the matrix X to an s-th row is Xs, a total sum for all the nodes of the number of contributions at each time is ys, and a value of a density function at x in Poisson distribution of average $\alpha$ is $P0(x, \alpha)$, the node influence learning unit acquires influence $\beta s$ of the group at time s as a value when minimizing a numerical value of $f(ys, Xs, \beta s)$ shown as $$f(y_s, X_s, \beta_s) + \lambda P(\beta_s), s=1, \ldots, S.$$

5. An information spread scale prediction device, including at least one computer device, which acquires text data from a specific website via the Internet, predicts number of future contributions made to the website based on the text data, and outputs a prediction result thereof, the information spread scale prediction device comprising:

learning text data input means including a processor for acquiring the text data from the specific website as learning text data;

group generating means including a processor for classifying nodes into groups based on information regarding attributes of each of the nodes indicating a specific user;

node influence learning means including a processor for classifying the learning text data by each topic, calculating influence for the number of contributions by each of the groups to which the node belongs for the topic from the number of contributions of each of the classified topics, and storing a result thereof as learning data to a storage module;

prediction text data input means including a processor for acquiring the text data from the specific website as prediction data after storing the learning data;

group/time information tabulation means including a processor for performing cross tabulation regarding the number of contributions from the learning text data and the prediction text data by each time and each of the groups, and outputting a result thereof to the node influence learning unit; and future contribution number prediction means including a processor for classifying the prediction text data by each topic, predicting the number of contributions of the topics at a specific future time based on the number of contributions by each of the classified topics, the learning data, and the number of contributions cross-tabulated, and outputting a result thereof to an output module;

wherein:

provided that the number of contributions cross-tabulated by each time and each of the groups is a matrix X, the number of contributions of a group j at time i of the matrix X is an element xij, a submatrix extracted from a first row of the matrix X to an s-th row is Xs, a total sum for all the nodes of the number of contributions at each time is ys, and a value of a density function at x in Poisson distribution of average $\alpha$ is $P0(x,\alpha)$, the node influence learning unit acquires influence $\beta s$ of the group at time s as a value when minimizing a numerical value of $f(ys, Xs, \beta s)$ shown as $$f(y_s X_s, \beta_s) + \lambda P(\beta_s), s = 1, \ldots, S.$$

* * * * *